(No Model.)
B. MENSCH.
Strainer for Privy Wells.
No. 228,661. Patented June 8, 1880.
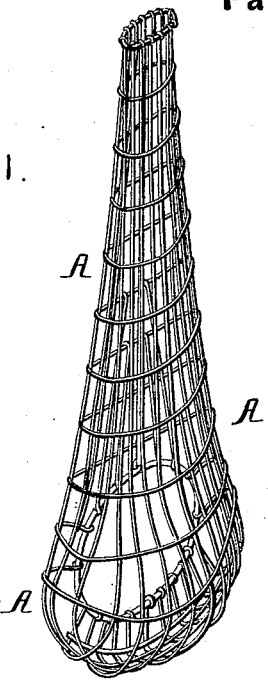
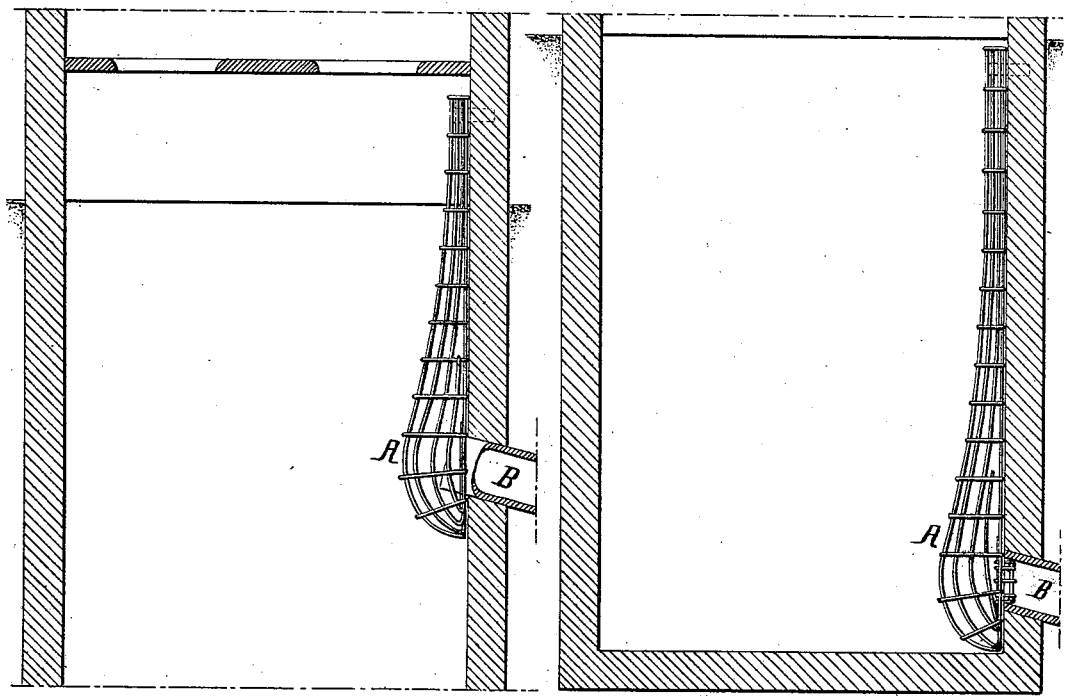
FIG. 1. FIG. 2. FIG. 3.
WITNESSES
James F. Tobin.
Henry Howson Jr.
INVENTOR
Barsheba Mensch
by her Attorneys
Howson & Son

UNITED STATES PATENT OFFICE.

BARSHEBA MENSCH, OF PHILADELPHIA, PENNSYLVANIA.

STRAINER FOR PRIVY-WELLS.

SPECIFICATION forming part of Letters Patent No. 228,661, dated June 8, 1880.

Application filed April 5, 1880. (No model.)

*To all whom it may concern:*

Be it known that I, BARSHEBA MENSCH, a citizen of the United States, residing in Philadelphia, Pennsylvania, have invented an Improvement in Strainers for Privy-Wells, of which the following is a specification.

My invention relates to an improvement in screens for application to the mouths of drainpipes of privy-wells, the object of my invention being to construct the screen and to adapt it to the mouth of the drain-pipe, so that it can be readily applied and removed, and so that the liability of the screen to become clogged will be materially reduced, and in the event of clogging the screen can be readily cleansed. This object I attain in the manner hereinafter set forth, reference being had to the accompanying drawings, in which—

Figure 1 is a perspective view of my improved screen for privy-wells, and Figs. 2 and 3 sectional views of wells, showing the manner of applying the screen to the drain-pipes of the same.

Privy-wells are usually provided with drain-pipes communicating with adjacent sewers, for the purpose of preventing the overflow of the well, as in Fig. 2, or for draining the well entirely, as in Fig. 3. These drains are liable to become choked by foreign matters thrown into the well through ignorance or with mischievous intent, thereby necessitating the tearing up of the pipe in order to cleanse the same.

Attempts have been made to overcome this difficulty by fitting a screen inside the mouth of the pipe; but this also becomes clogged, and, owing to its inaccessibility, it cannot be cleaned, and therefore proves of very little advantage. Screens arranged entirely within a well or basin and inclosing the mouth of the pipe have also been used; but such screens have been secured to the bottom and sides of the well or basin, and have consequently been difficult of application and removal.

These objections I overcome by making the screen as shown in the drawing, on reference to which it will be observed that the lower part of the screen A is made in the form of a bulb having in one side an opening, this opening being adapted for the reception of the end of the drain-pipe B, as shown in Fig. 2, or the opening being surrounded by a flange adapted to fit into the mouth of the pipe B, as shown in Fig. 3, so that the lower end of the screen is retained in position by the mouth of the pipe.

The screen tapers from the bottom to the top, and is of such a length that the upper end of the screen is at or near the top of the well, so that the screen is readily accessible for the purpose of cleansing if its surface should chance to become clogged.

This screen can be readily applied to privy-wells, and can be as readily removed therefrom, the cleaning of the well in order to permit the attachment or removal of the screen being unnecessary.

I do not desire to claim broadly the combination of a screen with the drain-pipe of a privy-well, but

I claim as my invention and desire to secure by Letters Patent—

The combination of the drain-pipe B of a privy-well with a screen, A, located within the well, the upper end of said screen extending to, or almost to, the top of the well, and the lower end of the screen being fitted to and retained in position by the mouth of the drain-pipe, as set forth.

In testimony whereof I have signed my name to this specification in the presence of two subscribing witnesses.

BARSHEBA MENSCH.

Witnesses:
JAMES F. TOBIN,
HARRY SMITH.